UNITED STATES PATENT OFFICE.

CONRAD SCHRAUBE, OF LUDWIGSHAFEN-ON-THE-RHINE, BAVARIA, ASSIGNOR TO THE BADISCHE ANILIN AND SODA FABRIK, OF MANNHEIM, GERMANY.

ROSINDULINE SULPHO-ACID.

SPECIFICATION forming part of Letters Patent No. 431,404, dated July 1, 1890.

Application filed June 5, 1890. Serial No. 354,382. (No specimens.) Patented in Germany May 6, 1888, No. 45,370, and in England October 23, 1888, No. 15,259.

*To all whom it may concern:*

Be it known that I, CONRAD SCHRAUBE, a subject of the King of Prussia, residing at Ludwigshafen-on-the-Rhine, in the Kingdom of Bavaria and German Empire, have invented new and useful Improvements in the Manufacture of New Red Dye-Stuff, (rosinduline sulpho-acid,) (for which Letters Patent have been obtained in Great Britain by Patent No. 15,259, dated October 23, 1888, and in Germany by Patent No. 45,370, dated May 6, 1888,) of which the following is a specification.

My invention relates to the manufacture of a new red dye-stuff, which is chemically a sulpho derivative of a red basic naphthaline coloring-matter which has recently received the name of rosinduline. (*Berichte der Deutsch. Chem. Ges.* 21.26.21. *Chem. Soc. Journ.* No. 313, December 1888, p. 1291.) This said rosinduline is formed when derivatives of alpha and beta naphthoquinone and nitroso and azo compounds of the naphthaline group are heated with aniline and aniline hydrochloride. Although many compounds of these classes may be used for the production of the red basic naphthaline coloring-matter or rosinduline, still in point of economy very variable results are obtained, and I prefer, therefore, to prepare the rosinduline by melting together benzene azo-alpha-naphthylamine with aniline hydrochloride and aniline, and to free the melt from unused aniline and aniline salt by boiling with dilute hydrochloric acid and filtering on cooling. This "crude product" or "melt freed from aniline" may be further purified by treatment with suitable solvents, or, preferably, may be at once treated with concentrated sulphuric acid and the crude monosulpho-acid thus obtained purified by conversion into its crystalline alkaline salts. The said monosulpho-acid is a crystalline body practically insoluble in water, and therefore not a dye-stuff; but owing to the crystalline properties of its salts it can readily be obtained in a state of practical purity, and is therefore a most suitable material from which to start in the preparation in accordance with this invention of one of the higher sulpho-acids, which are dye-stuffs.

Now I have found that whereas the action of concentrated sulphuric acid on rosinduline yields the monosulpho-acid practically alone, fuming sulphuric acid, monochlorhydrine sulpuric acid, $(SO_3ClH,)$ or similar compounds, whose action is due to their containing available sulphuric anhydride, yield either with rosinduline or with its monosulpho-acid higher sulpho-acids, which dye animal fiber a brilliant red color from the acid bath. By carefully and suitably moderating the action of fuming sulphuric acid or similar body, as above mentioned, on rosinduline, or preferably upon its monosulpho-acid, a disulpho-acid is produced possessing the following characteristic properties: It is a red crystalline powder slightly soluble in cold water, very much more readily in boiling water. A hot saturated solution on cooling deposits beautiful red crystals of the disulpho-acid, which are characterized by a brilliant bronze-like luster. It is slightly soluble in alcohol. It is soluble in concentrated sulphuric acid, producing a bright-green solution. Its reaction with caustic-soda solution differs essentially from that of the monosulpho-acid. If a little of the disulpho-acid be suspended in cold water and neutralized with caustic soda, a red solution is obtained, from which nothing separates out on boiling; but if too much caustic soda be added a red precipitate is obtained at once. A further characteristic test consists in adding a little sodium-chloride solution to a solution of the sodium salt of the disulpho-acid. A precipitate is obtained which dissolves on boiling, (if necessary, a little water must be added,) and on cooling red crystals with a brilliant bronze-like luster separate out. The chemical composition of the free disulpho-acid is represented by the formula $C_{28}H_{17}N_3(SO_3H)_2$. This disulpho-acid dyes animal fiber in the acid bath a beautiful crimson tint, and can be dyed in mixture with other acid dye-stuffs. It is further useful as a substitute for archil.

If the action of fuming sulphuric acid (or similar body, as aforesaid) upon the mono or di sulpho-acid or upon the red basic coloring-matter, or rosinduline itself be increased, an acid is obtained which is probably more highly sulphonated, and which is characterized by the following properties: It is not crystalline and is readily soluble in cold water. It is also rather easily soluble in alcohol. Its alkaline salts are very easily soluble in water and are not precipitated from solution by sodium chloride. While thus differing by not forming crystals and by its great solubility, even in solutions containing common salt, from the monosulpho-acid and from the disulpho-acid, it resembles both in forming a bright-green solution in concentrated sulphuric acid. Its dyeing properties are similar to those of the disulpho-acid mentioned above.

The following may serve as an example of the manner in which my invention is or may be best carried into effect:

Having regard to the easy solubility and amorphous character of this sulpho-acid and its salts, by which the purification of the same is rendered difficult, it is of great advantage to begin the sulphonating process with pure materials. Such materials are the red basic coloring-matter in its isolated or pure condition, preferably in the state of its sulphate or hydrochloride or the mono or di sulpho-acid prepared and purified as hereinbefore mentioned or described. The monosulpho-acid is preferred. About ten (10) parts, by weight, of the monosulpho-acid are gradually introduced into about sixty (60) parts, by weight, of fuming sulphuric acid, containing about twenty-three (23) per cent. of free or available anhydride while constantly agitating. During this operation the mixture is well cooled, and is then heated on a water bath to about one hundred (100) degrees centigrade, until a sample is easily and completely soluble in about twenty times its quantity of cold water. The entire product is then diluted with about one thousand (1,000) parts, by weight, of water, neutralized with milk of lime filtered, and the solution of the lime salt thus obtained is decomposed by carbonate of soda in order to prepare the sodium salt of the sulpho-acid, which may then be obtained in a solid condition by evaporating the filtered liquor.

I do not claim in this application for a patent the disulpho-acid of rosinduline hereinbefore mentioned, such being the subject-matter of a prior application for a patent filed March 3, 1890, Serial No. 342,445.

What I claim as new, and desire to secure by Letters Patent, is—

As a new article of manufacture, the hereinbefore-described sulpho-acid of the red basic naphthaline coloring-matter called "rosinduline," which sulpho-acid is characterized by the following properties: it is a red amorphous powder soluble in concentrated sulphuric acid, giving a bright-green solution; it is readily soluble in cold water and soluble in alcohol and yields amorphous alkaline salts, which are also readily soluble in cold water and cannot be percipitated by common salt, and it dyes animal fiber in the acid bath a bright red color.

In testimony whereof I have hereunto set my hand in the presence of two subscribing witnesses.

CONRAD SCHRAUBE.

Witnesses:
ERNEST F. EHRHARDT,
CARL KLOTZY.